Patented Dec. 8, 1953

2,662,030

UNITED STATES PATENT OFFICE 2,662,030

BRIQUETTING ASPHALT COMPOSITIONS

Maurice W. Stacy, Valparaiso, Ind., assignor to Standard Oil Company, Chicago, Ill., a corporation of Indiana No Drawing. Application November 24, 1950, Serial No. 197,502

2 Claims. (Cl. 106—279)

This invention relates to an improved asphalt composition. The application refers particularly to asphalt compositions that are modified so as to increase their ductility in order, for example, to be made suitable for briquetting purposes.

One of the important industrial outlets of petroleum asphalts is their use as the binding agents in various aggregate compositions and an important one of these uses is as a binder in briquettes. This employment has become sufficiently widespread that specifications have been established to define a uniform material. These specifications include established limits for softening points, penetration, ductility, and the like. The ductility requirement, as determined by test D11344 of the A. S. T. M. Standard on Petroleum Products and Lubricants (1946) Part II, Non-Metallic Materials—Constructional, page 583, is a minimum of 100, which is the length in centimeters a standard block of asphalt will stretch, at a temperature of 77° F. and at a fixed rate of stretching, before breaking.

The large influx of West Texas crude petroleum into the market and the almost universal employment of cracking procedures in the refining industry, now furnishes a large supply of thermally cracked residue. This cracked residue is typical of the products that are suitable for briquetting-asphalts except that their ductility is too low to provide products of required quality.

A primary object of the present invention is the provision of asphalt compositions having improved ductility characteristics. Another object of this invention is to provide an improved briquetting-asphalt composition.

Briefly stated, the present invention consists of heating asphalt to a liquid state and incorporating therein from 0.05 to 10 per cent and preferably 0.1 to 5.0 per cent of the polymeric residue of the product of hydrocarbon synthesis hereinafter defined in greater detail. The invention further comprehends the composition thereby provided; this composition comprises an asphalt of the type above defined and from 0.05 to 10 per cent of the said polymeric residue thoroughly distributed therein.

Asphalt having a low ductility and consequently requiring modification by the process of invention is generally obtained by thermally cracking a pressure-still charging stock obtained from a West Texas crude petroleum or crude oil of the same general type characterized usually by a relatively high sulfur content and having an analysis of the pattern illustrated in the following table, which reports an average of the analyses of three West Texas-type crude oils.

TABLE I

*Average of three West Texas crude oils*

| | |
|---|---|
| °API gravity | 31.3 |
| Sulfur, lamp, % | 1.32 |
| Sulfur, bomb, % | 1.76 |
| Pour point, °F | +3 |
| Viscosity, SSU 100° F | 44.0 |

The polymeric residue is obtained as a product of hydrocarbon synthesis wherein liquid hydrocarbons and oxygenated compounds are produced from hydrogen and carbon monoxide in the presence of an iron catalyst. Hydrocarbon synthesis is usually performed at temperatures from about 400° to 700° F. and under superatmospheric pressures from slightly in excess of atmospheric to as high as about 600 pounds per square inch gage. An enhanced yield of the polymeric residue is produced when the iron catalyst contains an alkali metal oxide or carbonate promoter.

The aforesaid polymeric residue is either a primary condensate from the condensible gases that are manufactured in the described hydrocarbon synthesis process or it can be a residue from a fractional distillation of liquid product therefrom or it can constitute a mixture of the two. The residue boils between about 400° and 750° F. and can have a first-drop temperature as determined by an ASTM distillation of substantially less than 400° F., for example 370° F., this latter temperature being exhibited by the polymeric residue employed in one of the specific examples. Polymeric residue has a pour point close to room temperature and is obtained, consequently, sometimes as a liquid and sometimes as a solid. The polymeric residue is a mixture of heavy hydrocarbons and oxygenated compounds, a high proportion of which is unsaturated. Of the hydrocarbons, some 20 to 30 per cent are paraffinic, and the remaining 70 to 80 per cent are olefinic. A very considerable portion of the olefins are monoolefins. The polymeric residue is soluble in 50–50 benzol-acetone, and ranges in carbon number from about $C_{11}$ to $C_{35}$ and perhaps, to a minor extent, somewhat higher. The product contains about 10 to 12 per cent oxygenated compounds including alcohols, aldehydes, acids, esters and ketones. Normally, about 5 per cent and a maximum of 10 per cent of the hydrocarbons are normal paraffins, the branching of the chains being largely methyl groups and increasing in number of branched chains per molecule with increase in molecular weight. At least about 25% by weight of the polymeric residue consists of the said oxygenated compounds and hydrocarbons that melt between about 120 and 212° F.

Although the above described polymeric residue is in part a waxy material that might be thought to be equivalent in effect in asphalts to other waxy materials, striking differences are to be found between the effects of petroleum waxes of the paraffin or microcrystalline type and the polymeric residue of the present invention. When petroleum waxes of the former type are employed, a marked decrease in the ductility of the asphalt is to be observed. It is believed that paraffin or microcrystalline waxes are not sufficiently miscible with the asphalt to increase the ductility. Perhaps there is formed an emulsion of the type described in Camp U. S. Patent No. 2,464,759 wherein a petroleum paraffin wax is added to asphalt to provide a water-repellent composition. It is probable that the stronger olefinic nature of the polymeric residue provides a greater miscibility with asphalt and thus avoids the formation of emulsions. Regardless, however, of the explanation, the fact is that polymeric residue in concentrations as low as 0.1 per cent by weight of the asphalt has been found to increase the ductility by a factor as high as 50.

According to the method of the present invention, an asphalt of the type above described and having a ductility lower than that required by the ultimate purpose of the asphalt is heated to a temperature about 100° F. above its softening point so as to ensure its liquidity. In some cases, the asphalt is then fluxed, or made more ductile, by addition of 5 to 10 per cent by weight of a simple distillation residue that consists of about 10 per cent of a total West Texas-type crude oil. Sometimes such blending does not contribute to the ductility and is dispensed with. Polymeric residue, in a quantity ranging from about 0.1 per cent to 10 per cent by weight based on the asphalt is then mixed thoroughly therewith while the asphalt is maintained at the said elevated temperature.

In the following specific examples, the polymeric residue that was employed was prepared under the following conditions. Hydrogen and carbon monoxide in a mol ratio of about 4:1 were passed through a reactor containing a fluid bed of an iron mill-scale catalyst containing 0.45 per cent by weight potassium oxide and 75.4 per cent by weight iron. The catalyst was reduced before the synthesis operation and a sample of the reduced catalyst contained 95.4 per cent elemental iron. The reactor was maintained at a temperature of 650° F. and at a pressure of 250 pounds per square inch gage. A recycle ratio of 2.9 was employed. The polymeric residue that was recovered by fractionation of the product consisted of the fraction boiling above 400° F. and having an A. S. T. M. distillation in the range from about 370° to 600° F. Approximately 30 per cent of the polymeric residue consisted of waxy material.

EXAMPLE 1

A low ductility briquetting-asphalt was heated to 250° F. and about 1 per cent by weight of the above described polymeric residue was blended into it by stirring. The properties of the asphalt before and after blending are listed below. The requirements of a single specification are given in Table II to provide a basis for comparison.

Other manufacturers' or consumers' specifications will contain approximately the same limits.

TABLE II

| | Specifications for a superior briq. asphalt | An untreated briq. asphalt | Asphalt + 1% polymeric residue |
|---|---|---|---|
| Softening point, ° F | 130–140 | 138 | 134 |
| Penetration at 77° F., mm./10 | 15–20 | 15 | 21 |
| Ductility at 77° F., cm min | 100 | 60 | 149 |
| Solubility in CCl₄, percent min | 99.0 | 99.6 | 99.5 |
| Specific gravity at 60° F min | 1.06 | 1.078 | 1.067 |
| Flash point, ° F min | 480 | 540 | 530 |
| Evaporation loss, percent max | 0.5 | 0.088 | 0.212 |

The first column is a tabulation of the requirements of a typical specification for briquetting-asphalt. The penetration at 77° F. for the blend is only one-tenth millimeter higher than the given specification, a value within the tolerance range of the A. S. T. M. specification. A notable result to be observed in the above table is the fact that the ductility is so markedly effected by the addition of the polymeric residue without substantial change in the other characteristics of the asphalt.

EXAMPLE 2

The residue from a thermally cracked gas oil derived primarily from a West Texas crude oil was reduced to a 135–145° F. softening point. This asphaltic material was thereafter heated to about 200° F. above the softening point. Polymeric residue was added to several portions of the molten asphalt in quantities of 0.1 per cent, 1.0 per cent and 10.0 per cent of total weight of the asphalt blend. The characteristics of these blends are reported in Table III given below. It is noted that the asphalt employed in this example is slightly harder than that of Example 1 (a penetration of about 10 compared to that of 15) but nevertheless polymeric residue was equally or even more effective in increasing ductility.

TABLE III

| | | | | |
|---|---|---|---|---|
| Asphalt, percent | 100 | 99.9 | 99.0 | 90.0 |
| Polymeric Residue, percent | | 0.1 | 1.0 | 10.0 |
| Softening Point, ° F | 141 | 140 | 138 | 103 |
| Penetration at 77° F., mm./10 | 10 | 9 | 11 | 125 |
| Ductility at 77° F., cm | 25 | 116 | 150+ | 107 |
| Solubility in CCl₄, percent | 99.5 | 99.3 | 99.3 | 99.0 |
| Specific gravity at 60° F | 1.105 | 1.107 | 1.107 | 1.083 |
| Flash, ° F | 560 | 535 | 435 | 310 |
| Evaporation loss, percent | 0.104 | 0.076 | 0.188 | 0.868 |

The second column of Table III shows that as small an amount as 0.1 per cent of the polymeric residue is sufficient to increase the ductility to a value higher than that required in the specifications. When one per cent of the residue is added to the asphalt the characteristics of the blend still fall within the requirements of the briquetting-asphalt specification. It is only when as high as 10 per cent of the polymeric residue is added to the asphalt that the product becomes too soft for the purpose of providing a briquetting-asphalt. In some instances, use of a slightly harder base or the reduction of the crude residue to a slightly higher softening point would establish a condition where 10 per cent of the residue may be the proper amount in a briquetting blend; of course, in other utilizations the predominant requirement may be a high ductility, and changes in other characteristics may be unimportant. As shown in Table III, 0.1 per cent by weight of polymeric residue is not the lower limit of effective additive quantities because the ductility provided by 0.1 per cent is higher than that required and in many cases 0.05 per cent would be sufficient so long as thorough distribution of the residue is obtained.

Having described my invention, I claim the following:

1. As a new composition of matter, a briquetting-asphalt comprising an asphalt having a softening point between about 125° and 150° F., a penetration at 77° F. of less than 15, a ductility at 77° F. of substantially less than 100, a flash point of between about 450–600° F. and an evaporation loss of less than about 0.5 per cent; and between 0.1 and 5.0 per cent, based on the asphalt, of the polymeric residue that is obtained as a distillate fraction boiling between about 400° and 750° F., having from about 11 to 35 carbon atoms per molecule and containing predominantly olefinic hydrocarbons and also organic oxygenated compounds, of the product of a hydrocarbon synthesis, the said combination having a softening point between about 115° and 140° F., a ductility at 77° F. greater than about 100 and the remaining characteristics substantially the same as the said characteristics for asphalt alone.

2. A composition of matter which comprises an asphalt having a softening point in the range of about 125° to 150° F., a penetration at 77° F. of approximately 1–2 mm., a ductility at 77° F. of substantially less than 100 cm., a flash point above 450° F. and an evaporation loss of less than about 0.5 per cent which asphalt contains as an added component an amount in the range of about 0.1 to 5 per cent based on the asphalt of a hydrocarbon synthesis product that boils about 400° F. and consists essentially of about 90 weight per cent hydrocarbons having predominantly about 11 to 35 carbon atoms per molecule and the remainder oxygen-containing compounds, about 70 to 90 weight per cent of the hydrocarbons being olefinic, the total composition having a ductility at 77° F. greater than 100 cm. and having a softening point, penetration, flash point and evaporation loss within the ranges herein set forth for the asphalt component.

MAURICE W. STACY.

References Cited in the file of this patent

UNITED STATES PATENTS

| Number | Name | Date |
|---|---|---|
| 327,477 | Spalding | Sept. 29, 1885 |
| 2,115,306 | Hampton | Apr. 26, 1938 |

FOREIGN PATENTS

| Number | Country | Date |
|---|---|---|
| 348,229 | France | Apr. 6, 1905 |